United States Patent [19]

Achiha et al.

[11] Patent Number: 4,530,004
[45] Date of Patent: Jul. 16, 1985

[54] COLOR TELEVISION SIGNAL PROCESSING CIRCUIT

[75] Inventors: Masahiko Achiha, Iruma; Kazuo Ishikura, Hachioji, both of Japan

[73] Assignee: Hitachi, Ltd., Tokyo, Japan

[21] Appl. No.: 454,488

[22] Filed: Dec. 29, 1982

[30] Foreign Application Priority Data

Jan. 6, 1982 [JP] Japan .................................. 57-339

[51] Int. Cl.³ ............................................. H04N 9/535
[52] U.S. Cl. ....................................... 358/11; 358/12; 358/13; 358/31
[58] Field of Search ....................... 358/11, 12, 13, 31, 358/30

[56] References Cited

U.S. PATENT DOCUMENTS 4,348,689 9/1982 Achiha .................................. 358/31
4,400,719 8/1983 Powers .................................. 358/11
4,415,931 11/1983 Dischert .............................. 358/140

Primary Examiner—Michael A. Masinick
Attorney, Agent, or Firm—Antonelli, Terry & Wands

[57] ABSTRACT

A color television signal processing circuit receives an input signal of a composite color television signal in the form of superimposition of a chrominance carrier signal on a luminance signal, separates the chrominance carrier signal and the luminance signal, and doubles the number of scanning lines of the chrominance signal or the luminance signal as compared to the number of scanning lines of the composite color television signal. A separation circuit separates the chrominance carrier signal and the luminance signal on the basis of a difference signal of the composite color television signal between adjacent frames or adjacent fields. A scanning line interpolation circuit doubles the number of scanning lines of at least the luminance signal delivered out of the separation circuit on the basis of an interpolation scanning signal derived from a signal indicative of scanning lines for the adjacent preceding field.

12 Claims, 5 Drawing Figures

COLOR TELEVISION SIGNAL PROCESSING CIRCUIT

This invention relates to a color television signal processing circuit and more particularly to a color television signal processing circuit of the type which treats a composite color television signal in the form of superimposition of a luminance signal and chrominance signals, whereby a received color television signal of a number of scanning lines is converted into a color television signal of a doubled number of scanning lines to thereby reproduce a high resolution picture.

In the NTSC color television system which is practically available at present, because of employment of the 2:1 interlace scanning, the regenerated picture of a color television receiver set is degraded in its vertical resolution and flicker is caused at edges of a horizontal stripe pattern.

On the other hand, it has been desired to obtain a high resolution picture, also improved in quality as compared to a picture reproduced by a conventional color television receiver set, with an inexpensive receiver set which is compatible with the current television system. In an attempt to approach this objective, a television transmission and reception system has been developed in which a transmission television signal pursuant to the current television system is used on the transmitter side and, on the receiver side, a received color television signal is interpolated by a previously received signal to convert the received color television signal into a television signal the scanning lines of which are doubled in number as compared to scanning lines of the transmission television signal to thereby reproduce a high resolution picture. The principle on which the above system is based to obtain the high resolution picture is such that the presently received signal and the signal received in the previous frame or field period are stored in a memory and read out alternately at a rate which is twice the horizontal scanning period of the signals transmitted to the memory, thereby producing a so-called time compressed television signal. In treating the composite color television signal, since it is impossible to directly subject the composite color television signal to time compression, the composite color television signal is separated into three kinds of signals (for example, red (R), green (G) and blue (B) signals, or a luminance signal Y and two color difference signals I and Q) which in turn are subjected to time compression independently and converted through a matrix circuit into a signal suitable for reproduction.

In this type of color television signal processing circuit conventionally proposed, the luminance signal and the chrominance signal (hereinafter referred to as the Y signal and the C signal, respectively) are processed by a luminance and chrominance separation circuit (hereinafter referred to as YC separation circuit) used in an ordinary color television receiver set.

Experiments conducted by the inventors of the present application showed that when the YC separation circuit used in the conventional ordinary color television receiver set was applied to the high resolution television receiver set in which the number of scanning lines was doubled, expected attainment of sufficient improvement in quality could not be accomplished even with the doubled number of scanning lines. In particular, a luminance pattern turned into a chrominance signal, a dot pattern appeared at a color change portion (edge) and resolution of the luminance signal was degraded, thus resulting in impairment of the picture quality. In other words, it has been proven that incomplete separation of the Y signal from the C signal leads to diluting the effect of improvement in picture quality resulting from doubling the number of scanning lines.

Accordingly, an object of this invention is to provide a color television signal processing circuit which can be used for a circuit capable of obtaining a high resolution television signal of scanning lines that are doubled in number as compared to scanning lines of a standard composite color television signal and which can make the most of the effect of improvement in picture quality resulting from doubling the number of scanning lines. Specifically, it is an object of this invention to eliminate degradation of picture quality due to dot crawl, degraded luminance resolution and cross-color in the high resolution television signal.

To accomplish the above object, according to the invention, a signal processing circuit receiving an input signal in the form of a composite color television signal produced by superimposition of a chrominance carrier signal on a luminance signal and converting the input signal into a color television signal, the scanning lines of which are doubled in number as compared to the scanning lines of the input signal, comprises a separation circuit for separating the chrominance carrier signal and the luminance signal on the basis of a difference signal of the composite color television signal between adjacent frames or adjacent fields, and a scanning line interpolation circuit for doubling the number of scanning lines in respect of at least the luminance signal of the separated chrominance carrier signal and luminance signal on the basis of an interpolation scanning signal derived from a signal indicative of the scanning lines for the adjacent preceding field.

Advantageously, the color television signal processing circuit according to the invention can improve picture quality by doubling the number of scanning lines and at the same time can completely eliminate degradation of picture quality due to dot crawl, degraded luminance resolution and cross-color which dilutes the effect of improvement in picture quality resulting from doubling the number of scanning lines, thereby making it possible to make the most of the improvement in picture quality resulting from doubling the number of scanning lines. The separation circuit for separating the luminance signal and chrominance signal is already known, but when this circuit is incorporated into an ordinary signal processing circuit for an interlace scanned television signal of scanning lines which are not doubled in number, it cannot fulfill the desired objective because of the flicker and degraded vertical resolution mentioned previously. It is of great significance for attainment of high resolution television reproduction pictures of high quality that the separation circuit is used with the composite color television signal processing circuit adapted to double the number of scanning lines so as to combine their effects.

The above-mentioned and other features and objects of this invention will become more apparent by making reference to the following description taken in conjunction with the accompanying drawings, in which.

Figure 1:
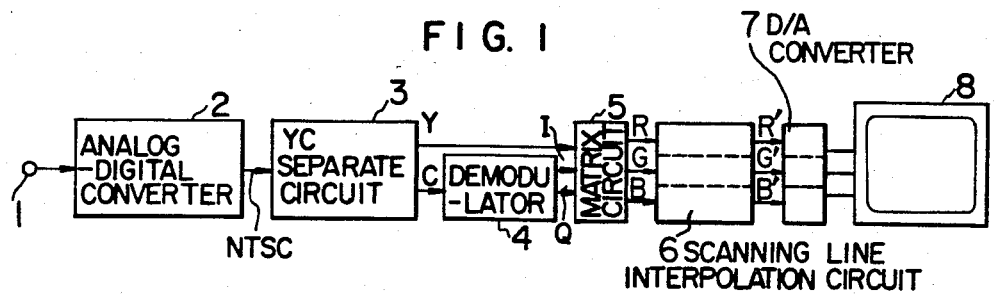
FIG. 1 is a block diagram showing an overall construction of a high resolution television receiver set incorporating a color television signal processing circuit according to the invention.

A color television receiver set imcorporating a color television signal processing circuit according to the invention will now be described with reference to FIG. 1, which is illustrative of the overall construction thereof and in which an audio signal processing circuit having no relation to the present invention is omitted for simplicity of illustration.

A composite color television signal fed to an input terminal 1 is converted by an analog-digital converter 2 into a digital signal and is separated into a luminance signal Y and a chrominance carrier signal C by a YC separation circuit 3 utilizing a frame memory. The thus obtained C signal is demodulated by a chrominance demodulator 4 into two kinds of color difference signals I and Q which are fed to a matrix circuit 5 also receiving the Y signal and are converted into three primary color signals through the following arithmetic operation:

$$\left. \begin{array}{l} R = Y + 0.96\,I + 0.63\,Q \\ G = Y - 0.28\,I - 0.64\,Q \\ B = Y - 1.11\,I + 1.72\,Q \end{array} \right\} \quad (1)$$

The three primary color signals are then converted by a scanning line interpolation circuit 6 into three primary color signals R', G' and B', the scanning lines of each of which are doubled in number. These three primary color signals R', G' and B' are recovered by three digital-analog (D/A) converters 7 into analog video signals and are displayed on a high resolution color display unit 8.

Figure 2:
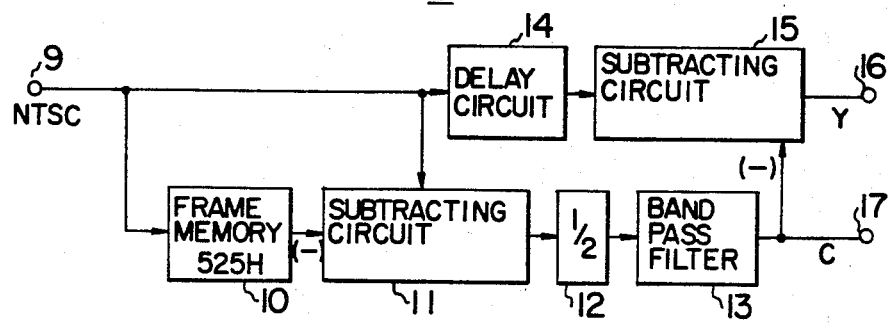
FIG. 2 is a block diagram showing one embodiment of a YC separation circuit used in the arrangement of FIG. 1.

Reference is now made to FIG. 2 showing a construction of one embodiment of the YC signal separation circuit 3 used in the FIG. 1 arrangement. The composite color television signal pursuant to the NTSC system fed to an input terminal 9 is is applied to a subtracting circuit 11 along with a signal associated with the preceding frame and which is delayed by means of a frame memory 10 having a storage capacity of 525H by an amount corresponding to one frame period of the television signal (H represents the time for one horizontal scanning period). Since the inter-frame phase difference of the chrominance carrier is 180° and the inter-frame luminance component is approximate, the subtracting circuit 11 produces an output signal in which the chrominance carrier component is doubled in magnitude and the luminance component is removed. Accordingly, when the output signal of the subtracting circuit 11 is passed through a coefficient circuit 12 with a coefficient of $\frac{1}{2}$, a signal is produced therefrom which is an average of the chrominance component over the inter-frame. This average signal is then passed through a band pass filter (BPF) 13, thus producing at an output terminal 17 a signal having a chrominance carrier signal C an from which the luminance signal component has been removed. On the other hand, the NTSC signal is partly fed to a delay circuit 14 having the same delay time as the BPF 13 for delay time adjustment and is then applied to a subtracting circuit 15. In the subtracting circuit 15, the chrominance carrier signal C is subtracted from the NTSC signal to produce the luminance component Y of the NTSC signal. The separated C signal delivered out of the separation circuit 3 and then processed by the chrominance demodulator 4 and the separated Y signal are processed by the matrix circuit 5 as shown in FIG. 1 so as to be converted into R, G and B signals. The circuits 4 and 5 are well known in the art and will not be described in detail herein.

Figure 3:
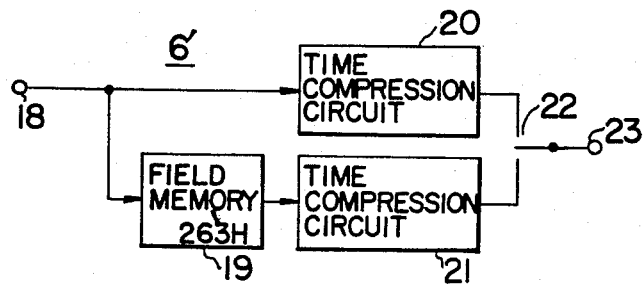
FIG. 3 is a schematic block diagram for explaining the principle of a scanning line doubling circuit.

The scanning line interpolation circuit 6 has a plurality of similar elemental units, one of which is illustrated in FIG. 3 for simplicity of illustration. Since various types of the elemental unit are known and available, only the principle of the elemental unit will be explained briefly. The Y signal or one of the R, G and B signals separated as explained previously is fed to an input terminal 18 and is applied on the one hand to a time compression circuit 20 and on the other hand to a field memory 19 having a delay time of 263H. The field memory 19 produces an output signal representative of a field signal for the preceding field which traces a space between scanning lines for the present field in the case of the interlace scanning system. Accordingly, a signal, the scanning lines of which are doubled in number, can be obtained by compressing the time axis for the present field signal and the preceding field signal by $\frac{1}{2}$ by means of time compression circuits 20 and 21 and by switching a switch circuit 22 each time a scanning line occurs on the basis of the compressed time axis.

According to the foregoing embodiment, the luminance signal and the chrominance signal are ideally separated from each other and the scanning line doubling operation utilizing the field memory is effected on the basis of the chrominance signal from which cross-color is eliminated and the luminance signal from which dot crawl and degraded resolution are eliminated, so that degradation of picture quality due to edge flicker and degraded vertical resolution attendant on the interlace scanning can be eliminated, thereby assuring a picture display of very high quality.

One frame memory is provided for the YC separation circuit 3 and three field memories are provided for the scanning line doubling circuit 6 in the embodiment of FIG. 1 but it is desirable to minimize the number of memories employed for the system for the purpose of reduction of cost.

Figure 4:
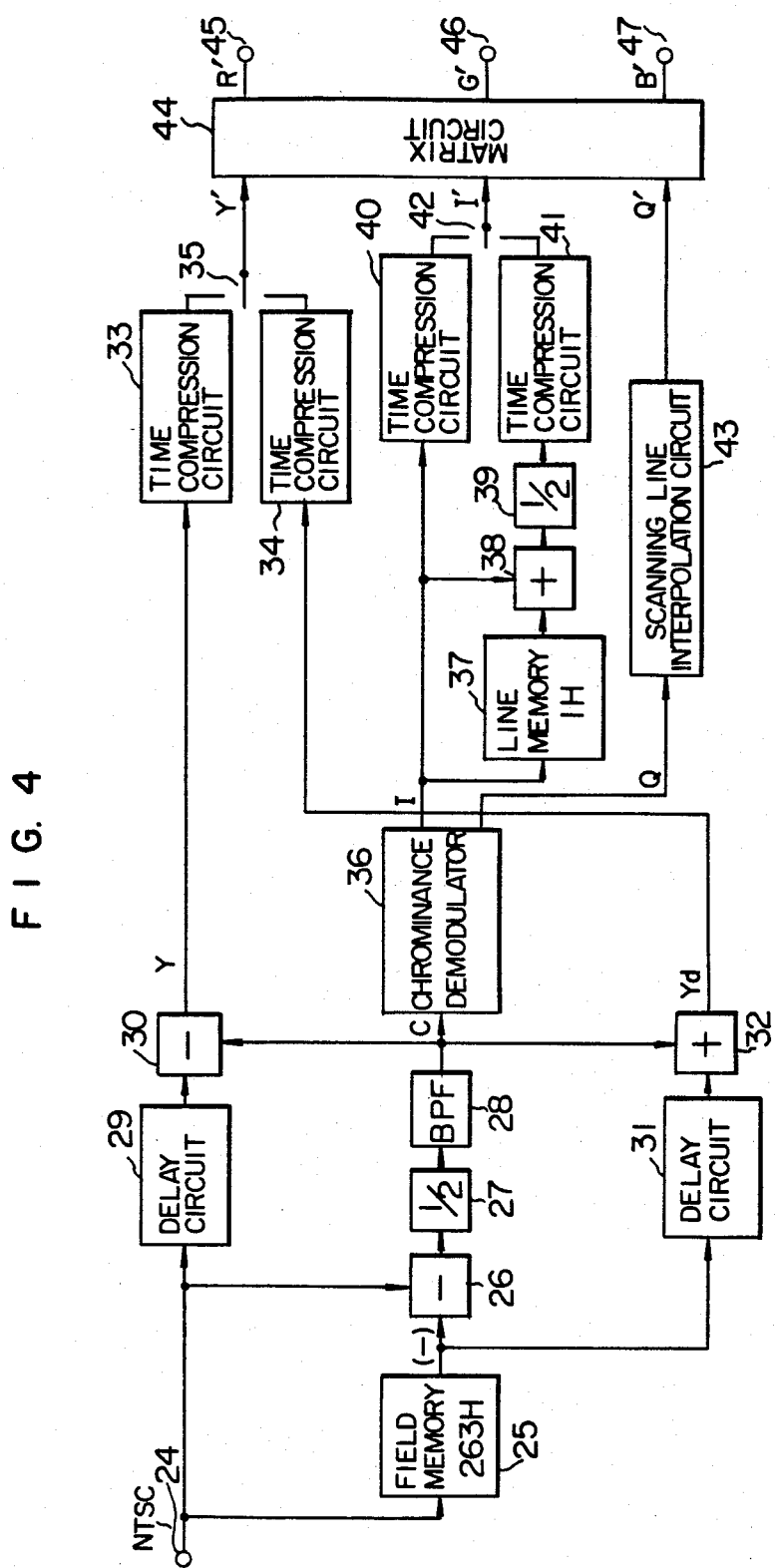
FIGS. 4 and 5 are schematic, diagrammatic representations of color television signal processing circuits embodying the invention.

In another embodiment of the signal processing circuit of the invention as shown in FIG. 4, a single field memory suffices for constructing the processing circuit adapted for the YC separation and scanning line doubling. A digitized composite color television signal pursuant to the NTSC system is applied to an input terminal 24. The input signal is fed to a field memory 25 having a capacity of 263H, the output of which is applied to a subtracting circuit 26, which also receives the input signal from terminal 24. The output of circuit 26 is applied through a $\frac{1}{2}$ coefficient circuit 27 and a BPF 28 to extract the chrominance carrier signal C. A signal delayed by 263H with respect to the present signal is representative of scanning lines interlaced on the screen, and the delayed signal and the present signal are highly correlated to each other from the standpoint of vertical phase relationship of a picture, and the subcarrier signals for these signals have polarities which are different from each other by $\pi$. Accordingly, subtraction of these signals is effective for extraction of a substantially ideal C signal. The thus obtained C signal and a signal delayed by the same delay time as that of the BPF 28 by means of a delay circuit 29 for delay adjustment are subtracted at a subtracting circuit 30 to produce a T signal. Also, the C signal and a signal delayed similarly by means of a delay circuit 31 are added at an adder circuit 32 to produce a luminance signal Yd which is delayed by 263H with respect to the Y signal. These signals Y and Yd are then compressed by ½ in respect of their time axis by means of time compression circuits 33 and 34 and passed through a switch circuit 35 to produce a luminance signal Y' of scanning lines which are doubled in number.

Since human vision is less sensitive to the chrominance signal than the luminance signal, any appreciable degradation of picture quality will not be observed on a color picture display even if an interpolation scanning line signal for the chrominance signal is prepared by using an average of adjacent scanning lines in the same field without resort to any field memory. From this point of view, the C signal produced from the BPF 28 in FIG. 4 is demodulated by a chrominance demodulator 36 into two kinds of color difference signals I and Q, the color difference signal I is processed in a line memory 37 with a capacity of 1H, an adder circuit 38 and a ½ coefficient circuit 39 to calculate an average of adjacent scanning lines in the same field, and the average signal and the original signal I are compressed by ½ in respect of their time axis by means of time compression circuits 40 and 41 and a switch circuit 42 to produce an I' signal of a doubled number of scanning lines. Similarly, the color difference signal Q is processed by a scanning line interpolation circuit 43 to produce a Q' signal. The thus obtained Y', I' and Q' signals are subjected to the arithmetic operation of equation (1) at a matrix circuit 44, thereby producing on output terminals 45, 46 and 47 the R', G' and B' signals which are doubled in the number of their scanning lines.

In the case of a still picture of a still object, a color picture of high quality can be reproduced through the use of the foregoing embodiment. For a moving object appearing in ordinary television broadcasting programs, however, the foregoing embodiment utilizing the signal preceding by one frame or field period is disadvantageous because specific degradation of picture quality takes place at a picture region corresponding to a moving distance of from 1/30 to 1/60 of a second.

Figure 5:
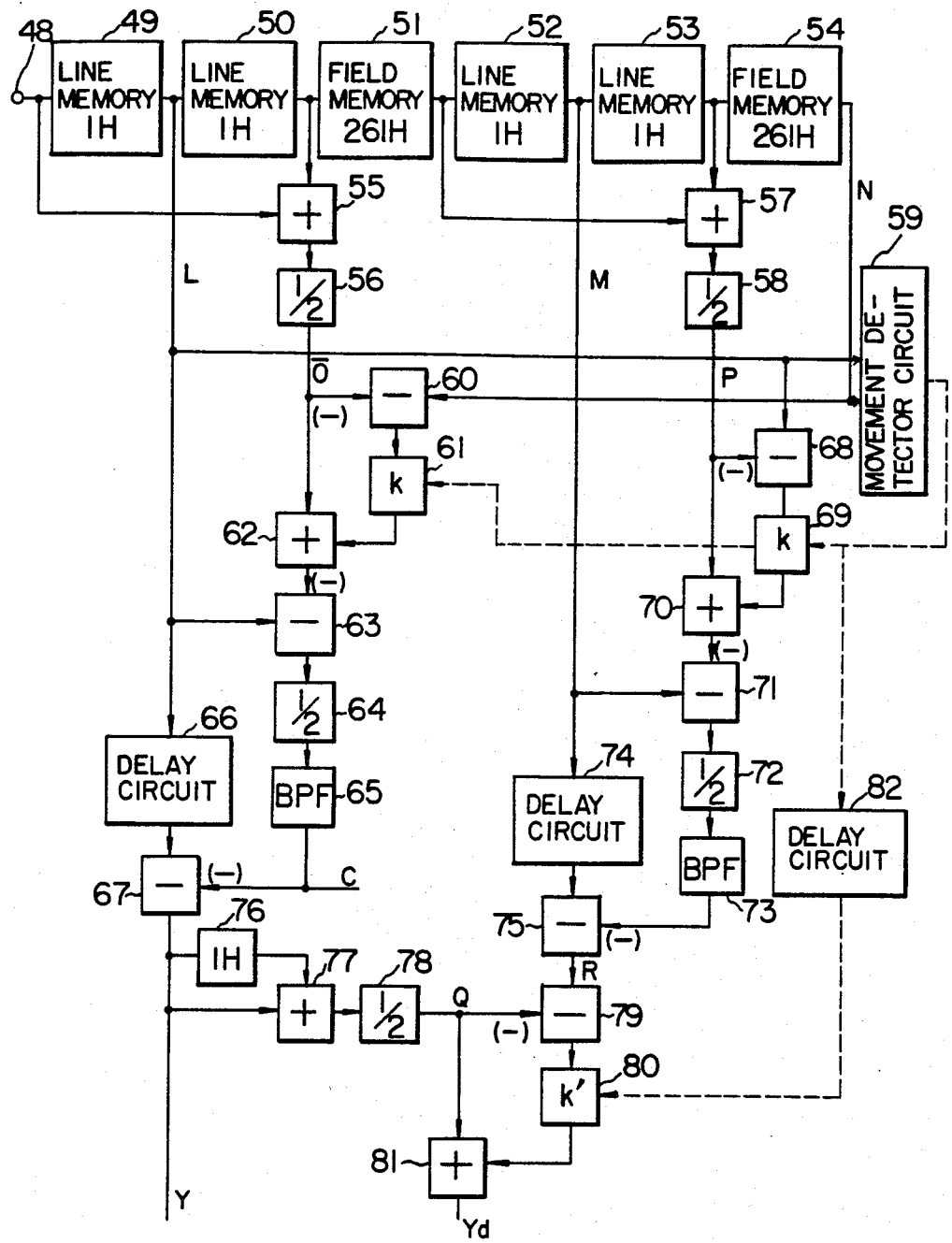

FIG. 5 shows another embodiment wherein presence or absence of movement is detected by the use of a signal of the preceding frame, and the moving portion is subjected to YC separation and scanning line doubling processing which makes use of adjacent scanning lines within the field. In FIG. 5, a digitized composite color television signal applied to an input terminal 48 is passed through four line memories 49, 50, 52 and 53 and two field memories 51 and 54 each having a capacity of 261H and as a result, a signal N is produced which is delayed by one frame (525H) with respect to a reference output signal L from the line memory 49.

Thus, the signals L and N are representative of picture positions of the same picture on the same scanning lines which are spaced from each other by one frame period. Accordingly, when a movement detector circuit 59 extracts a low frequency component representative of the difference between the signals L and N, for example, a signal can be obtained which is zero when an object stands still and which is proportional to a difference in luminance of a moving object, and this signal is used as movement information.

This embodiment has a memory of one frame period and it will therefore permit production of a chrominance carrier signal from the inter-frame difference, as in FIG. 2, by utilizing the signal N of the preceding frame with respect to the signal L. However, since the inter-frame difference signal fails to represent a correct chrominance carrier signal for a moving object, an average O of upper and lower adjacent scanning lines within the same field is calculated for the signal L through an adder circuit 55 and a ½ coefficient circuit 56, and the chrominance signal is extracted from a difference signal between the signal L and the average O. When the signals N and O are subjected to an arithmetic operation pursuant to $$O+k(N-O)=kN+(1-k)O$$

through subtracting circuit 60, multiplier circuit 61 and adder circuit 62 while changing k from 0 to 1 by the output of the detector circuit 59, the mixing ratio of signals N and O can be obtained which changes with the magnitude of the inter-frame difference signal. This mixing ratio is subtracted from the signal L at a subtracting circuit 63, multiplied by ½ at a coefficient circuit 64 and subjected to band restriction at a BPF 65 to thereby produce a chrominance carrier signal C which is less degraded and is adapted for movement. The chrominance carrier signal C is then subtracted at a subtracting circuit 67 from the signal L delayed through a delay circuit 66 and as a result, a luminance signal which is less degraded and is adapted for movement can be obtained.

Similarly, with a signal M delayed by one field with respect to the signal L, an inter-line difference signal P is produced and the mixing ratio of the signal P and an inter-field difference signal is obtained which changes with movement by means of a movement adaptive type YC separation circuit including adder circuits 57 and 70, ½ coefficient circuits 58 and 72, subtracting circuits 68, 71 and 75, multiplier circuit 69, BPF 73 and delay circuit 74. Thus, a luminance component of the signal M is produced as an output signal R from the subtracting circuit 75.

The interpolation signal necessary for doubling the number of scanning lines standing for the signal R in the case of a still object is obtained in the form of a luminance signal Yd in the case of a moving object. To this end, an average Q of adjacent scanning lines for the signal Y within the same field is first calculated by means of line memory 76, adder circuit 77 and ½ coefficient circuit 78. Subsequently, the mixing ratio k' of the signals R and Q is controlled by a signal, corresponding to a movement information output from the movement detector circuit 59 and delayed by a delay circuit 82 for delay adjustment, through subtracting circuit 79, multiplier circuit 80 and adder circuit 81, so that the luminance signal Yd for interpolation scanning lines which is adapted for the movement information can be produced from the adder circuit 81.

A processing circuit for doubling the number of scanning lines on the basis of the signals Y, Yd and C is the same as that of the FIG. 4 embodiment connected between outputs of the subtracting circuit 30, adder circuit 32 and BPF 28 and the output terminals 45, 46 and 47, and will not be described herein.

In the FIG. 5 arrangement, the luminance component P of the signal M may alternatively be obtained by delaying the luminance component O of the signal L through a field memory with a capacity of 263H.

As described above, the embodiment of FIG. 5 can assure production of a color picture signal of high quality which is free from degradation in the case of a moving object.

The high resolution color display unit 23 adapted to display a color picture signal resulting from signal conversion in the embodiment of FIG. 1 is not limited to a color display tube (CPT), a color projector or the like. The color picture signal may be used as a high quality picture signal that is converted into an optical image which is recorded on film or printed on suitable paper.

As has been described, according to the invention, the high quality color signal devoid of dot crawl, cross-color and edge flicker and which is free from degradation of resolution by doubling the number of scanning lines can be obtained from a composite color television signal of the NTSC system or the like system, and it can be displayed on a display unit, such as a high resolution color monitor, to provide a color display of very high quality.

What is claimed is:

1. A color television signal processing circuit for processing an input line interlace composite color television signal, which has been formed by superimposition of a chrominance carrier signal on a luminance signal, by separating the chrominance signal and the luminance signal of the composite color television signal and doubling the number of scanning lines of each field as compared to the number of scanning lines of a field of the line interlace composite color television signal, said processing circuit comprising:

separation circuit means for separating said chrominance signal and said luminance signal by subtracting the received composite color television signal from the composite color television signal for the next adjacent field; and scanning line interpolation circuit means for doubling the number of scanning lines of at least the luminance signal provided by said separation circuit means.

2. A color television signal processing circuit according to claim 1 wherein said separation circuit means comprises a field memory for delaying the input composite color television signal by one field period, first subtracting means for producing a difference signal between said input composite color television signal and an output signal of said frame memory, second subtracting means for subtracting said difference signal from said input composite color television signal, and means for providing the output signals of said first and second subtracting means as the chrominance signal and the luminance signal, respectively.

3. A color television signal processing circuit according to claim 1 wherein said separation circuit means comprises a field memory for delaying the input composite color television signal by one field period, first subtracting means for producing a difference signal between said input composite color television signal and an output signal of said field memory, and second subtracting means for subtracting the output signal of said first subtracting means from said input composite color television signal, and wherein said scanning line interpolation circuit comprises an adder circuit for adding the output signal of said first subtracting means to the output signal of said field memory, time compression means including a pair of memories for writing the output signal of said second subtracting means into one memory and the output signal of said adder circuit into the other memory and reading the signals written into the memories at a rate which is twice the rate for writing, means for converting the output signal of said first subtracting means into and I signal and a Q signal, and means for producing an interpolation scanning signal from adjacent scanning lines within the same field for the I and Q signals.

4. A color television signal processing circuit according to claim 1, wherein said separation circuit means comprises memory means connected to receive said composite color television signal for delaying that signal by an integral number of field periods, first subtracting means for subtracting the output of said memory means from the received composite color television signal to produce a difference signal having only a chrominance component, dividing means connected to the output of said first subtracting means for dividing said difference signal to produce a chrominance signal, and second subtracting means for subtracting said chrominance signal from the received composite color television signal to produce a luminance signal.

5. A color television signal processing circuit according to claim 4, wherein said memory means delays said composite color television signal by one field period.

6. A color television signal processing circuit according to claim 4, wherein said memory means delays said composite color television signal by two field periods.

7. A color television signal processing circuit for processing a line interlace composite color television signal, which has been formed by superimposition of a chrominance signal on a luminance signal, by separating the chrominance signal and the luminance signal of said composite color television signal and doubling the number of scanning lines of each field as compared to the number of scanning lines of a field of said line interlace composite color television signal, said processing circuit comprising:

separation circuit means for separating the chrominance signal and the luminance signal by subtracting the composite signal of a frame from another composite signal of the adjacent frame; and scanning line interpolation circuit means for interpolating at least the luminance signals between the adjacent lines to double the number of scanning lines of at least said luminance signal separated by said separation circuit means.

8. A color television signal processing circuit according to claim 7 wherein said separation circuit means comprises a frame memory for delaying the input composite color television signal by one frame period, first subtraction means for producing a difference signal between said input composite color television signal and an output signal of said frame memory, second subtracting means for subtracting said difference signal from said input composite color television signal, and means for providing the output signals of said first and second subtracting means as the chrominance signal and the luminance signal, respectively.

9. A color television signal processing circuit according to claim 7 wherein said separation circuit means comprises a field memory for delaying the input composite color television signal by one field period, first subtracting means for producing a difference signal between said input composite color television signal and an output signal of said field memory, and second subtracting means for subtracting the output signal of said first subtracting means from said input composite color television signal, and wherein said scanning line interpolation circuit means comprises an adder circuit for adding the output signal of said first subtracting means to the output signal of said field memory, a time compression means including a pair of memories for writing the output signal of said second subtracting means at a certain speed into one memory and the output signal of said adder circuit into the other memory and reading the signals written into the memories at a speed which is twice the speed of said writing, means for converting the output signal of said first subtracting means into an I signal and a Q signal, and means for producing an interpolation scanning signal from adjacent scanning lines within the same field for the I and Q signals.

10. A color television signal processing circuit according to claim 7, wherein said separation circuit means comprises memory means connected to receive said composite color television signal for delaying that signal by an integral number of field periods, first subtracting means for subtracting the output of said memory means from the received composite color television signal to produce a difference signal having only a chrominance component, dividing means connected to the output of said first subtracting means for dividing said difference signal to produce a chrominance signal, and second subtracting means for subtracting said chrominance signal from the received composite color television signal to produce a luminance signal.

11. A color television signal processing circuit according to claim 10, wherein said memory means delays said composite color television signal by one field period.

12. A color television signal processing circuit according to claim 10, wherein said memory means delays said composite color television signal by two field periods.

* * * * *